US011939529B2

(12) United States Patent
Mastellone

(10) Patent No.: US 11,939,529 B2
(45) Date of Patent: Mar. 26, 2024

(54) PLASTIC-TO-OIL PLANT, ACCORDING CRACKING REACTOR, AND RELATED METHODS FOR CONVERTING PLASTIC WASTE INTO PETROCHEMICAL PRODUCTS

(71) Applicant: Pruvia GmbH, Zirndorf (DE)

(72) Inventor: Maria Laura Mastellone, Caserta (IT)

(73) Assignee: Pruvia GmbH, Zirndorf (DE)

( * ) Notice: Subject to any disclaimer, the term of this patent is extended or adjusted under 35 U.S.C. 154(b) by 0 days.

(21) Appl. No.: 17/603,441

(22) PCT Filed: Apr. 15, 2020

(86) PCT No.: PCT/EP2020/060558
§ 371 (c)(1),
(2) Date: Oct. 13, 2021

(87) PCT Pub. No.: WO2020/212403
PCT Pub. Date: Oct. 22, 2020

(65) Prior Publication Data
US 2022/0204863 A1    Jun. 30, 2022

(30) Foreign Application Priority Data

Apr. 17, 2019    (DE) .................... 10 2019 110 186.7

(51) Int. Cl.
*C10G 1/10*    (2006.01)
*B01D 3/14*    (2006.01)
(Continued)

(52) U.S. Cl.
CPC ................. *C10G 1/10* (2013.01); *B01D 3/14* (2013.01); *B01D 53/18* (2013.01); *C10G 1/002* (2013.01); *C10G 2300/1003* (2013.01)

(58) Field of Classification Search
None
See application file for complete search history.

(56) References Cited

U.S. PATENT DOCUMENTS

| 4,443,229 A | 4/1984 | Sageman et al. |
| 4,444,007 A | 4/1984 | Mitchell et al. |

(Continued)

FOREIGN PATENT DOCUMENTS

| CA | 2350180 | 12/2002 |
| DE | 2759823 C2 | 2/1984 |

(Continued)

OTHER PUBLICATIONS

Wilk et al. "Conversion of fuel nitrogen in a dual fluidized bed steam gasifier", Fuel, IPC Science and Technology Press, Guildford, GB, vol. 106, Jan. 3, 2013 (Jan. 3, 2013), pp. 793-801 (Year: 2013).*

(Continued)

*Primary Examiner* — Tam M Nguyen
(74) *Attorney, Agent, or Firm* — Thorpe North & Western, LLP; Jed H. Hansen

(57) ABSTRACT

A plastic-to-oil plant for converting plastics into petrochemical products is disclosed. Operation shall be energy- and resource-efficient. To reach this aim, the inventions suggests a plastic-to-oil plant, having a cracking reactor for a pyrolysis reaction, wherein plastics, in particular polyolefins, are converted into at least gasified pyrolysis products and char.

9 Claims, 7 Drawing Sheets

(51) Int. Cl.
  *B01D 53/18* (2006.01)
  *C10G 1/00* (2006.01)

(56) References Cited

U.S. PATENT DOCUMENTS

| | | | |
|---|---|---|---|
| 2012/0065440 A1 | 3/2012 | Fraczak et al. | |
| 2014/0182194 A1* | 7/2014 | Unger | C10K 1/04 44/605 |
| 2015/0080626 A1* | 3/2015 | Boon | C10K 3/04 585/242 |
| 2018/0371325 A1* | 12/2018 | Streiff | C10G 11/187 |
| 2019/0002664 A1* | 1/2019 | Streiff | C08J 11/12 |
| 2021/0269721 A1* | 9/2021 | Fareid | C10G 45/00 |
| 2021/0308644 A1* | 10/2021 | Araújo Carreira | B01J 6/008 |
| 2022/0119987 A1* | 4/2022 | Trapp | B09B 3/40 |
| 2022/0135893 A1* | 5/2022 | Trapp | C01B 3/36 48/197 R |
| 2022/0169931 A1* | 6/2022 | Trapp | C10J 3/721 |
| 2022/0204863 A1* | 6/2022 | Mastellone | B01D 3/14 |
| 2022/0380682 A1* | 12/2022 | Daley | B01J 19/002 |

FOREIGN PATENT DOCUMENTS

| | | |
|---|---|---|
| JP | H0731845 U | 6/1995 |
| JP | H08170081 A | 7/1996 |
| JP | 2004125299 A | 4/2004 |
| TW | 201348303 A | 12/2013 |

OTHER PUBLICATIONS

Goransson K. et al: "Review of syngas production via biomass DFBGs", Renewable and Sustainable Energy Reviews, Elseviers Science, New York, NY, US, vol. 15 No. 1, Jan. 1, 2011, pp. 482-492, XPO27480778, ISSN: 1364-0321, DOI: 10.1016/J.RSER.2010.09.032.

Wilk V. et al.; "Conversion of fuel nitrogen in a dual fluidized bed steam gasifier", Fuel, IPC Science and Technology Press, Guildford, GB, vol. 106, Jan. 3, 2013, pp. 793-801, XPO28996200, ISSN: 00116-2361, DOI: 10.1016/J.FUEL.2012.12.056.

* cited by examiner

|  | T range, °C | # Flow | Mass flow, t/h | Heat flow, MW |
|---|---|---|---|---|
| IN | 350-400 | 0 | 1,77 | 0,436 |
| OUT | na | 1 | - | 0,123 |
| IN | 250-280 | 2 | 0 | 0 |
| OUT | 450-530 | 3 | 1,55 | 0,559 |
| IN | 700-900 | 4 | 5,5 | 0,782 |
| OUT | 400-500 | 5 | 5,7 | 0,536 |
| IN | na | 6 | - | 1,61 |
| IN | 200-350 | 7 | 7,52 | 0,489 |
| OUT | 700-900 | 8 | 7,75 | 1,86 |

PLASTIC-TO-OIL PLANT, ACCORDING CRACKING REACTOR, AND RELATED METHODS FOR CONVERTING PLASTIC WASTE INTO PETROCHEMICAL PRODUCTS

TECHNICAL FIELD

The invention relates to a plastic-to-feedstock plant, also known as a plastic-to-oil plant. It also relates to a cracking reactor for preferred use in such a plant. Finally, the invention relates to an according method for converting plastics into petro-chemical products.

BACKGROUND ART

In a so-called plastic-to-oil (PtO) plant plastics are converted into petrochemical products like oil or diesel. This usually involves a thermal pyrolysis process called 'cracking' which is conducted in a cracking reactor.

More specifically, the plastic waste that is not convenient or possible to address to mechanical recycling, if composed by polyolefins (polymers composed by carbon and hydrogen without heteroatoms such as oxygen, nitrogen, sulfur, etc.), can be converted in a mixture of hydrocarbons mainly ranging between carbon number C1 to C12 and other heavier molecules (C>12) by a so-called cracking process. The fraction from C1 to C4 corresponds to non-condensable gas (i.e. compounds with a boiling point lower than 25° C.) while the C5-C12 fraction, having a boiling temperature between 36° C. and 216° C., is liquid at ambient conditions and corresponds to kerosene, jet fuel, gasoline fraction. The cracking process to realize the conversion into these products is usually a thermal/catalytic degradation (pyrolysis) in an inert (without oxygen/oxidant) environment which is called a cracking reactor.

The cracking reactors available on the market can be divided into three main classes:

a) continuous reactors where the heating is provided indirectly by using heat exchanging pipes where diathermic oil (or other heating vector) flows inside the tubes by transmitting the heat into the reactor by a convective-conductive in series resistance. This method has a large concern because the maximum temperature that can reached by commercial heating oil is less than 400° C. and its lifetime becomes shorter as much the temperature increases. Moreover, the external surface of pipes is fast covered by carbonaceous deposit due to the chemical interaction between carbon and metal cations; this deposit lowers the heat exchanger coefficient and obligates to frequent maintenance. The mixing in these reactors is not good and laminar flow is established because of cluttered of heating pipes. Since plastics are very bad heat conducting materials, this lack of mixing can create non-uniform reaction rates that is, in any case, low at this temperature level.

b) continuous or semi-continuous reactors where the heating is indirectly provided by electric resistances immersed in the reactor wall or other external sources such as infra-red or microwave. In these cases, it is necessary to promote mixing by using mechanical agitators because the temperature at the reactor wall exceeds the target mean temperature. The intense mixing inside the reactor has drawback related to safety because the sealing of screw at high speed can be difficult. The cost of electricity for heating the reactor strongly affects the operating cost for this kind of reactor.

c) A completely different reactor is a plug-flow reactor, such as rotary kiln and screw reactors. These reactors promote a progressive reaction that is not uniform along the x-axis by definition with a negligible back-mixing. The heating is provided throughout the external surface (barrel) towards the mass contained inside the reactor. The transfer inside the mass is limited by the internal resistance offered by the reacting matter (having a low convective coefficient due to the low Reynolds number and poor conductivity coefficient). The limited diameter allowing a flat temperature profile strongly limits the maximum capacity of the reactor.

DISCLOSURE OF THE INVENTION

Problem to be Solved by the Invention

A first objective underlying the present invention is to provide a plastic-to-feed-stock or plastic-to-oil plant for converting plastics, in particular molten plastic waste, into petrochemical products which overcomes the problems mentioned above in connection with the prior art. More specifically, the plastic-to-oil plant shall be easy to build, to operate, and to maintain. Operation shall be energy- and resource-efficient with a high recycling rate. A second objective is to provide a cracking reactor for preferred use in such a plant. The cracking reactor also shall be easy to build, to operate, and to maintain. In particular, the cracking reactor shall be designed for fast and efficient heating and mixing of the materials fed. A third objective is to provide an according method for operating the plastic-to-oil plant in general and the cracking reactor in particular. A fourth objective is to provide an according method of converting plastics into petrochemical products.

Means for Solving the Problem

According to the invention the first objective is achieved by a plastic-to-feedstock or plastic-to-oil plant according to claim 1. The second objective is achieved by a cracking reactor according to claim 12. The third objective is achieved by a method according to claim 17. The fourth objective is achieved by a method according to claim 30.

Advantageous embodiments and advancements of the basic concept are disclosed in the dependent claims and in the subsequent description.

The invention is based on the consideration that a key equipment of the plant to perform plastic-to-oil conversion is the reactor where cracking occurs (cracking reactor) but the role of all other equipment is crucial to guarantee the energetic sustainability of the overall process, the quality of products and the positive economic return of the operation.

In this spirit, claim 1 suggests a plastic-to-oil or plastic-to-feedstock plant for converting plastics, in particular plastic waste, into petrochemical products, the plant comprising a cracking reactor for a pyrolysis reaction or thermochemical process, wherein plastics, in particular polyolefins, are converted into at least gasified pyrolysis products and char, and further comprising a separate combustor, the cracking reactor comprising a plastics inlet port, in particular a plastic melt flow inlet port, a particles inlet port, a pyrolysis products outlet port, and a char and particles outlet port, the combustor comprising a char and particles inlet port, a combustion air inlet port, and a combustion products and particles outlet port, the char and particles outlet port of the cracking reactor being fluidically/flow-wise connected to the char and particles inlet port of the combustor, and the combustion products and particles outlet port of the combustor being fluidically/flow-wise connected to the particles inlet port of the cracking reactor, preferably via a fluid/particles separator, the cracking reactor and the combustor therefore being part of a particles loop which contains a multitude of—preferably but not necessarily inert—solid particles, such that during operation the particles are cycled from the cracking reactor to the combustor and back, wherein the cracking reactor is designed such that mixing in the cracking reactor is promoted mainly or even exclusively by a flow of sand particles fed at the top of the cracking reactor essentially in counter-current with a flow of the pyrolysis products, without need of mechanical mixing devices.

Thereby, the char discharged from the cracking reactor is fed as primary fuel into the combustor, while the preferably inert particles transfer combustion heat from the combustor to a plastic melt inside the cracking reactor and support stirring within the cracking reactor. In the same cycle the particles are cleaned in the combustor from pyrolysis residue agglomerated in the cracking reactor. This way, a highly efficient and resource-saving cracking and combustion cycle is realized within the twin-system constituted by the cracking reaction and the combustor.

Throughout this description the term 'char' is to be understood in a broad sense and includes those residues obtained from the pyrolysis reaction in the cracking reactor which are not sent to the fractionation or distillation column, including heavy (e.g. carbon number>20) hydrocarbons.

Preferably, the particles comprise quartz and/or silica sand and/or ceramic coated spherule. Even catalytic particles may be used, for instance made by an alumina-based material, with a particle density preferably in the range 1800-3000 kg/m$^3$, and in a preferred size range from 50 microns to 400 microns. Anyway, the density and size preferably characterize the particles in the groups A or B of Geldart classification.

In a preferred embodiment, a fluid/particles separator which is used for separating the particles from the fluidic combustion products in the flow discharged from the combustor comprises a cyclone separator. Instead of cyclone, any other gas-solid or fluid-solid separator can be used such as non-mechanical valves (e.g. L-valve, V-valve, etc.). The separator may be connected to the combustion products and particles outlet port of the combustor through a line section, or alternatively may be integrated into the combustor. In the latter case the combustor may comprise separate outlet ports for the particles and for the fluidic combustion products.

In a preferred embodiment, a flue gas line leads from the flue gas outlet of fluid/particle separator to a flue gas treatment facility which preferably comprises a scrubbing unit.

Preferably, the pyrolysis products outlet port of the cracking reactor is connected via a pyrolysis gas exhaust line to a fractionation section and/or distillation column in which the pyrolysis exhaust gas is converted into petrochemical products.

In a particularly advantageous embodiment, a heat transfer loop is provided and configured to transfer heat from a flue gas flow within the above-mentioned flue gas line to a gaseous pyrolysis products flow within the pyrolysis gas exhaust line leading to the distillation column. Thus, the gaseous pyrolysis products flow is recuperatively heated before entering the distillation column, thereby improving the efficiency of the distillation process.

Preferably, the heat transfer loop comprises a diathermic oil as a heat transfer medium. The heat transfer loop may further comprise an active heat pump.

Preferably, a pyrolysis products recirculation line is connected to the cracking reactor such that during operation condensed ('heavy') pyrolysis products are at least partially recirculated into the cracking reactor. A heat exchanger flown through by a cooling medium may be used for the condensation. Separation of the thus liquified part and the gaseous part of the pyrolysis products flow may happen in a liquid/gas separator.

In another advantageous embodiment, a heat exchanger is arranged in the flue gas line such that the heat exchanger transfers heat of a flue gas flow within the flue gas line to a combustion air flow within a combustion air supply line leading to the combustion air inlet port of the combustor. Thus, the combustion air flow is recuperatively heated before entering the combustor, improving efficiency of the combustion.

Preferably, a recycled fuel gas return line leads from the fractionation section or distillation column to the combustor. Hence, a small part of the petrochemical products regained from the plastic input feed into the plant may be used as additional fuel in the combustor, in addition to the primary fuel constituted by carbonaceous interstage products occurring in the cracking-combustion cycle.

Furthermore, a recycled fuel gas line preferably leads from the fractionation section or distillation column to a combustion engine which is coupled to an electrical generator. Hence, a small part of the petrochemical products regained from the plastic input feed into the plant may be used to produce electricity for various devices within the plant.

Preferably, the the combustor comprises or is realized as an entrained flow riser. This is explained further below.

An advantageous cracking reactor, in particular for usage in a plastic-to-oil plant specified above but possibly for usage in other plants and technical process as well, has a reactor vessel comprising a bottom section, a middle section and a top section, the reactor vessel further comprising a plastics inlet port, in particular a plastic melt flow inlet port, opening into the bottom section or middle section, a particles inlet port leading into a channel which opens into the middle section and preferably (in part) also opens into the top section, a pyrolysis products outlet port discharging from the top section, and a char and particles outlet port discharging from the bottom section.

Preferably, the plastic inlet port feeds a plastic melt flow into an annular chamber which opens into the middle section of the reactor vessel via a number of distributors, in particular nozzles, which are capable of injecting high viscous plastic melt with high pressure, exemplary in the magnitude of 100 bar, into the vessel body. Preferably, the pressure is within the range from 50 bar to 80 bar or even greater, such that the molten polymer injected into the reactor vessel forms a liquid-like melt. In particular, the annular chamber or plenum is located in the bottom section and surrounds the char and particles outlet port.

Preferably, said channel for (re-) introduction of particles is realized as an interspace between an external reactor vessel wall and a heat conductive internal partition wall.

Larger reactors install vertical standpipes to promote a uniform distribution of particles from the top to the bottom.

In a preferred application within the plastic-to-oil plant described above, the cracking reactor is designed to be heated exclusively by the input flows into the reactor vessel, in particular by a (preferably pre-heated) plastics input flow and by a hot particles flow coming from a separate/external combustor. That means that there are no additional heating devices.

Preferably, the cracking reactor is designed to accomplish stirring and/or mixing exclusively by the input flows into the reactor vessel, in particular the input plastic flow, the particles flow, and possibly the recycled liquid pyrolysis products flow. This means that no mechanical or movable or other mixing or stirring devices are required or present.

In order to support this objective, the cracking reactor is preferably designed for a mainly turbulent flow regime inside the reactor vessel.

With respect to the method for operating a plastic-to-oil plant specified above, the char discharged from the cracking reactor is fed as primary fuel into the combustor, wherein the particles are cycled within the particles loop from the cracking reactor to the combustor and back, thereby transferring combustion heat from the combustor to a plastic melt inside the cracking reactor and supporting stirring within the cracking reactor. The particles are cleaned in the combustor from pyrolysis residue agglomerated in the cracking reactor.

Preferably, an input plastic melt flow is fed continuously into the cracking reactor.

Furthermore, a particles flow is preferably fed continuously or quasi-continuously into the cracking reactor. Quasi-continuously means that the feed may be interrupted for relatively short amounts of time enough short to avoid temperature decreasing in the reactor for example during operation of a rotating valve or the like in the feed line. The role of rotating valve is to create a static head between the separator exit and the point where the flow is introduced in the cracking reactor and to favor the particle flow distribution in case of large cracking reactors; in this case the particles flow is preferably introduced in more than a unique point. The rotating valve can be substituted by other devices that allow to control the distribution as, for instance, a mechanical feeder similar to that located at bottom to extract the flow of particles and chars.

In a preferred embodiment, the cracking reactor is heated exclusively by the input flows into the reactor vessel, in particular by a plastics input flow and by an particles flow coming from the combustor. Thus, no other heating devices, like electrical heaters or heating loops, are required.

Similarly, stirring and mixing inside the cracking reactor is preferably accomplished exclusively by the input flows into the reactor vessel, without any other mixing or stirring devices.

In a preferred embodiment, a combustion airflow, before entering the combustor, is recuperatively heated by heat contained in a flue gas flow discharged from the combustor.

In a further preferred embodiment, a gaseous pyrolysis products flow discharged from the cracking reactor, before entering a distillation column, is recuperatively heated by heat contained in a flue gas flow discharged from the combustor.

In yet a further preferred embodiment, a gaseous pyrolysis products flow coming from the cracking reactor enters a fractionation section and/or distillation column to be converted into petrochemical products, like a heavy residues flow, a diesel flow, a light hydrocarbons flow, and/or a non-condensable gas flow.

Advantageously, a non-condensable gas flow discharged from the fractionation section or distillation column is fed as additional fuel into the combustor, as explained above in connection with the according device claim.

The temperature required for the cracking process in order to promote the cracking with a reasonably high rate of conversion should be higher than 430° C. but lower than 500° C. in order to avoid an undesired increase of gas fraction production. Therefore, the temperature inside the cracking reactor is preferably set within said range.

Preferably, the temperature inside the combustor is set in the range from 700 to 1,000° C.

In a preferred embodiment, the temperature inside the combustor is controlled by setting the combustion air flow rate, the combustion air temperature and/or the recycled fuel gas return flow rate.

Correspondingly, the temperature inside the cracking reactor is preferably controlled by setting the temperature inside the combustor, as explained above, the plastics feed rate, and/or the particle flow rate.

Finally, the invention suggests a method of converting plastics into petrochemical products, wherein plastics and a multitude of hot particles are fed into a cracking reactor for the plastics to undergo a pyrolysis reaction, wherein char produced during pyrolysis is drained from the cracking reactor together with the particles, both being fed into a separate combustor for the char to be combusted under supply of air, wherein the particles are extracted from the combustor and fed again into the cracking reactor, and wherein fluidic pyrolysis products are extracted from the cracking reactor and fed into a distillation column to be converted into petrochemical products, and wherein mixing in the cracking reactor is mainly or even exclusively promoted by a flow of said particles fed at the top of the cracking reactor essentially in counter-current with a flow of the pyrolysis products, without need of mechanical mixing devices.

In other words, the plastic melt is injected essentially from the bottom towards the top of the reactor while the fine-grained particles or granules are fed (essentially in counter-current) from the top and drop towards the bottom, leading to a self-sustaining, highly turbulent mixing regime.

The above explanations and remarks with respect to the operation of the plant apply in an analogous manner.

Effects of the Invention

The concept of the plant according to the invention can be summarized as follows:

Within the cracking reactor heating and mixing are provided by the same medium without mechanical parts in motion and without external heating. This avoids hot spots/surfaces and the related carbonization, losses of flammable gases from sealings (tubes, screws, etc.) and allows a "perfectly stirred" behavior of the reactor for both mass and heat transfer. As a consequence, the kinetics is fast since it is controlled by heating (at, for example, 450° C. the intrinsic kinetics is so fast to be considered negligible with respect to the heating rate).

The mixing in the reactor is promoted by a flow of hot particles fed at the top of reactor essentially in counter-current with the pyrolysis products. The hot particles exchange heat with liquids and gases, thereby promoting a homogeneous transfer. At the bottom, where particles accumulated together with heavier products and carbon, a non-mechanical valve transports the particles and the carbon stuck on them to a circulating fluidized combustor where the carbon is burned, the particles cleaned and heated at, for example, 900° C. A cyclone or a similar separator mounted at the top of the combustor, preferably equipped with a rotary valve, feeds the regenerated particles back in the reactor.

This concept avoids any expensive methods to provide heating, any mechanical part inside the reactors, the disposal of carbon and allows to control the temperature level in the reactor by simply increasing the energy flow of the hot particles (both particle mass flow and temperature in the combustor can be regulated). The fast kinetics, mixing and proper residence time will allow to avoid recycling of pyrolysis products to the reactor.

Key features of the plant and reactor design according to the invention are therefore efficient devices and methods to promote fast and homogeneous heating and fast and good mixing in the cracking reactor.

The plant and the corresponding devices and processes according to the invention overcome all the drawbacks mentioned above in connection with the prior art; in particular:
a) The cracking reactor according to the invention is heated by a direct exchange, thus the indirect methods known from the prior art (e.g. heated oil, electricity, microwave, infrared, etc.) and their drawbacks are completely avoided.
b) The reactor is fully mixed without need of mechanical devices.
c) The heating is fast and homogeneous.
d) The energy to heat the reactor is obtained by using the chemical energy of process residues and byproducts, thereby saving non-renewable sources and decreasing operating costs.

BRIEF DESCRIPTION OF THE DRAWINGS

In the following, exemplary embodiments of the invention are described with reference to the accompanying drawings.

Corresponding or functionally equivalent elements are designated the same reference symbols throughout the drawings.

DETAILED DESCRIPTION OF PREFERRED EMBODIMENT(S)

Figure 1A:
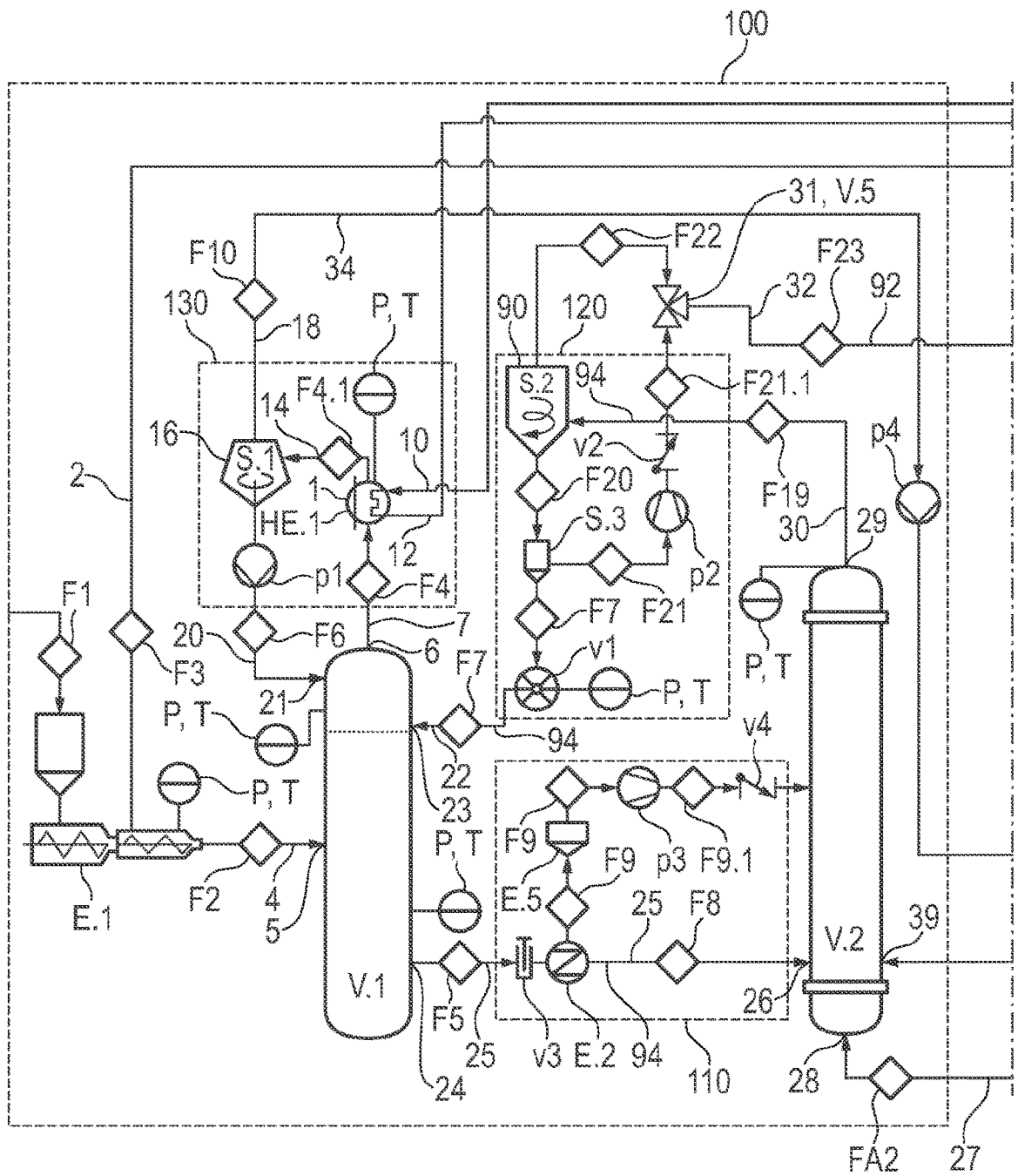
FIG. 1, which has been divided into three sections with according sub-figures FIG. 1a, FIG. 1b, and FIG. 1c in order to increase the readability, provides an overview, by means of a schematic process flow diagram, of a so-called plastic-to-oil (PtO) plant according to the invention and the related processes for converting plastic waste, in particular polyolefin waste, into petrochemical products

The invention is based on the following general observations.

Plastic Waste: Market & Fees.

The starting point is related to the plastic waste market: nowadays the fraction of collected plastics actually sent to mechanical recycling is limited to PET (polyethylene-terephthalate) and HDPE (high-density polyethylene). The remaining part of polyolefins like LDPE (low-density polyethylene), PP (polypropylene), or polystyrene (PS) have a poor market and their value is low. All engineered polymers, those containing heteroatoms (O, N, Cl, S, . . . ), multilayered compounds and others are destined to energy recovery as it is or after addition to other waste (secondary fuels).

A critical point for the correct design of a chemical treatment plant is related to the plastic source used as feed to the chemical process: how it has to be composed, by which kind of polymers and in which proportions, how and from where it can be obtained, at which gate fee. A survey of the market showed that the commingled plastics resulting from a sorting inside the so-called material-recovery facilities contains a large fraction of material suitable for chemical conversion, but it needs of an intense sorting, cleaning and conditioning before to become a proper feed. By an economic point of view, this plastic mixture has got a negative gate fee (disposal cost) in such countries like Italy that have a deficit of incinerators' capacity. Countries like Germany increased their fees by a factor of two in the last years for many wastes imported from other countries and set the obligation to avoid the construction of further landfills and traditional incinerators. Another interesting point is that the "waste export" is possible only towards countries that apply the EU Directives for waste management and environmental protection and into plants that performs recovery/recycling operations (R operations) while disposal (D) operations are forbidden. This restriction impedes the export to third countries for indiscriminate landfilling.

Plastic Waste: Typology.

Once the plastic source is identified, the technology must be chosen with respect of plastic waste characteristics and product quality specifications. The plastic waste suitable for PtO conversion is the group of polyolefins (such as HDPE, LDPE, PP, PS), usually given as a mixture, but the plastic waste available on the market at high negative gate fee is a mixture containing other materials PET (polyethylene terephthalate), PVC (polyvinyl chloride), paper, etc. This leads to the necessity referred to as a sorting plant: it can be integrated with PtO or not. The advantages of integration are: control of plastic quality fed in the PtO, income from gate fee, optimization of the whole process (energy efficiency). The disadvantages are: higher investment in capex, wider areas for installation and storage, more traffic impact, issues about impact on environment to be considered.

Plastic Waste: Sorting and Pretreatment.

The plastic waste taken as reference in the following description is the worse mixture (large amount of foreign matter) available on the market (with higher gate fee). A sorting plant composed by equipment able to sort by size, density and polymer type will remove ferrous metals, aluminum, paper & textiles, glass & inserts, PET, PVC and will produce a mixture of polyolefins that are sent to a shredder. After the shredding, drying is carried out into dryers using hot air, preferably with a certain degree of moisture fixed at 10% (the hot air is preferably produced by the PtO itself as a byproduct of its intended operation as described further below). The cleaned, dried and homogenized plastic scraps flow is sent to a buffer before to be sent to the PtO line described in detail in the following paragraphs.

Overall Plant Design and Process Description.

FIGS. 1a, b and c provide an overview, by means of a schematic process flow diagram, of a so-called plastic-to-feedstock plant or plastic-to-oil (in brief: PtO or P2O) plant according to the invention and the related processes during operation of the plant for converting plastics, in particular polyolefin waste, into petrochemical products/feedstock (in particular oil and fuel gas). As is apparent from the preceding and subsequent description, a large variety of petrochemical products or feedstock may be produced, depending on the application and the technical installations downstream to the reactor and combustor core processes. Hence, the well-established term "plastic-to-oil plant" which is sometimes used in this description for the sake of simplicity does also cover other final products than oil. Every instance of "plastic-to-oil" might therefore be substituted by "plastic-to-feedstock" or "plastic-to-petrochemical-feedstock".

The figure is divided into sections, surrounded by dotted lines, the meaning of which will be apparent from the subsequent description: 100-110-120-130 are the reactions' section; 200 is the section where the pyrolysis products are cooled down, fractionated and stored; 220 is the section where the fuel gas as separated from liquid fraction is sent to energy recovery; 230 is the flue gas and off gas cooling section with heat recovery; 300 is the water circuit; 310 is the scrubbing section of flue gas and off gas.

An input flow F1 of plastic waste at ambient temperature, here a polyolefin mixture, previously sorted, cleaned, shredded and dried, and preferably having a maximum amount of moisture of 10% and preferably a maximum fraction of chlorine of 1%, enters the plant in a commercially available feeding and pre-conditioning equipment E.1. The feeding and pre-conditioning equipment E.1 is preferably able to promote densification, heating, degassing (in particular with respect to moisture and hydrochloric acid, if chlorine is present) and complete melting of the plastics. The off-gas flow F3 of this pre-conditioning process, typically at 300° C., is sent to cleaning in a scrubbing unit E.4 via off-gas line 2 before being sent to further cleaning stages and ultimately being vented into the environment. The melt flow F2, which preferably is a low viscous liquid flow at preferably 400° C., is sent via plastic melt flow feed line 4, also called input feed line, to a cracking reactor V.1 described in detail further below, entering the reactor vessel at plastic melt flow inlet let port 5.

In the cracking reactor V.1 the fed plastic melt is undergoing a thermo-chemical cracking or pyrolysis process, preferably at a process temperature in the range of 450-500° C. The main output flow, i.e. pyrolysis products output flow F4, from the cracking reactor V.1 is constituted by pyrolysis products that exit at said temperature of preferably 450-500° C. (depending of the set-up value for reactor operation) via pyrolysis products outlet port 6 and the subsequent pyrolysis products output line 7. The flow F4 is sent to a heat exchanger 1 (also labelled HE.1) that removes heat by decreasing the temperature from said value to preferably 260° C. The fraction of pyrolysis products having a high molecular weight condenses and becomes liquid. Therefore, the heat exchanger 1 can be regarded as a partial condenser. In the heat exchanger 1 the heat removed from the flow F4 is transferred to a flow of cooling medium, preferably cooling water. The cooling medium enters the heat exchanger 1 at cooling medium supply line 10 at preferably 15° C. and leaves via cooling medium discharge line 12 at preferably 80° C. The corresponding cooling medium supply and re-cooling devices/systems are indicated in the FIG. 1c (section 300) but need not be described here in detail.

The flow of cooled-down pyrolysis products leaving the heat exchanger 1 is led via connecting line 14 into a gas-liquid separator 16 (also labelled S.1), wherein the liquid constituents are separated from the gaseous constituents. The gaseous pyrolysis products flow F10 is drawn via pyrolysis gas exhaust line 18 to further treatment described below. The liquid pyrolysis products flow F6, also called recycled heavy products flow, emerging from the separator 16 is recirculated in the cracking reactor V.1 via pyrolysis products recirculation line 20 at preferably 260° C. and enters the reactor vessel at recycled pyrolysis products inlet port 21 to undergo a further cracking and reduce the molecular weight in the desired range. This partial condensation with recycling to the reactor can be avoided if the heavy fraction is small.

Another flow, namely (recycled) particles flow F7 or alternatively recycle flow, composed by particles pre-heated in another reactor, namely combustion reactor or briefly combustor V.2, enters the cracking reactor V.1 via (recycled) particles feed line 22 and (recycled) particles inlet port 23, for example at 750° C., thereby adding the sensible heat necessary to reach the desired temperature for pyrolysis reaction by means of a direct heat exchange of the mixing flows inside the reactor vessel. The particles, in particular quartz and/or silica sand and/or ceramic coated spherule etc., are continuously cycled between the cracking reactor V.1 and the combustor V.2. to support the pyrolysis process in the cracking reactor V.1 as described in detail below. Essentially, the particles do not directly participate in the chemical pyrolysis reactions or only do so to a small extend and are therefore regarded as catalytic and/or inert particles.

The particles are extracted from the bottom of the cracking reactor V.1 together with the carbonaceous solid fraction (briefly: coke or char) produced by polymers cracking (a.k.a. pyrolysis) via char and particles outlet port 24 and char and particles output line 25, at a temperature corresponding to the temperature inside the cracking reactor V.1, preferably at 450° C. The char and particle flow F5 is addressed and fed at controlled rate by means of a transport and metering system E.2 into the combustor V.2 via char and particle inlet port 26 at said temperature. The char and particles output line 25, in this context also called metering line, is kept under a slight negative pressure in order to avoid oxygen inlet (backflow from combustor V.2) in the reactor V.1. This is achieved by a suction pump p3, which on the inlet side is fluidically connected via suction buffer E.5 to the transport and metering system E.2 and on the outlet side discharges into the combustor V.2.

Air is in fact fed in the combustor V.2 as combustion air flow FA2 via combustion air supply line 27 and combustion air inlet port 28 in order to promote combustion of carbonaceous material coming from the reactor V.1. Before entering the combustor V.2 at combustion air inlet port 28, the air drawn from the environment by air pump/blower p7 (air flow FA1) is preferably pre-heated (in section 230) to reach preferably 250° C. as described further below. The complete combustion of carbon and residues mixed with the particles extracted by the cracking reactor V.1 is guaranteed by using an excess of oxygen and a suitable residence time.

The combustor V.2 is preferably an entrained reactor, where the superficial gas velocity is much greater than the particles terminal velocity (see detailed description below). In this way the particles are cleaned from residues stuck over them, that is residues agglomerated in the preceding pyrolysis process in the cracking reactor V.1. During the combustion process in the combustor V.2 at, for example, 750° C. the particles are heated due to exothermic reaction and then transported out of the combustor V.2 with flue gas along the reactor riser and via combustion products and particles outlet port 29 and combustion products and particles output line 30 (as combustion products output flow F19, for example at 750° C.) to a fluid/particles separator 90 which preferably is cyclone separator S.2.

In the cyclone separator S.2 the particles are separated from the combustion flue gas. The hot particles flow, also called (recycled) particles flow F7 or recycle flow is introduced to the cracking reactor V.1 at preferably 750° C. via (recycled) particles feed line 22 and (recycled) particles inlet port 23, as already described above. The particles buffer S.3 within the particles feed line 22 between cyclone separator S.2 and cracking reactor V.1 is maintained at very slight negative pressure with the help of suction pump p2 to guarantee the absence of flue gas in the recycled particles flow F7 introduced to the cracking reactor V.1. Therefore, suction pump p2 is fluidically connected to the buffer S.3 on the inlet side and to the flue gas line 32 (see next paragraphs) on the outlet side.

Therefore, the cracking reactor V.1 and the combustor V.2 are part of a particles loop 94 which contains a multitude of solid particles, such that during operation the particles are cycled from the cracking reactor V.1 to the combustor V.2 and back.

The flue gas flow F22 from the cyclone separator S.2 and the purge gas flow F21 from the buffer S.3 are mixed at line junction 31 (three-way valve) and sent as flue gas flow F23 at preferably 750° C. via flue gas line section 32 to heat exchanger HE.2 (preferably a dry cooler) and to heat exchanger HE.3 that transfers part of the heat to the combustion air flow FA1/FA2. The flue gas flow F23.3 then is sent to another heat exchanger HE.4 (cooler) in order to decrease the flue gas temperature below 100° C. At this temperature the flue gas flow F23.4 can be addressed to the scrubbing unit E.4. The whole heat exchanger line can be adapted to specific cases in order to optimize the heat recovery. The heat flow can be used, for instance, to feed the air dryers of plastic scraps in the sorting line.

The gaseous pyrolysis products flow F10/F10.1 coming from separator 16 enters via fractionation gas input line 34 and by using pump p4 in the partial condenser S.5, coupled to the heat exchanger HE.5, thereby producing the flow F11 of condensed pyrolysis products or "syncrude" (synthetic crude oil) at a temperature below 260° C. (section 210). After a final cooling process within heat exchanger HE.7 these products are stored in the oil tank T.1 for further delivery and usage.

The vapor phase leaving the partial condenser S.5 is sent to a second condenser S.6, coupled to heat exchanger HE.6, to complete the condensation and the consequent separation between the non-condensable gas (flow F15) and the liquid phase (flow F14). This latter flow F14 is delivered by means of p8 pump into the mixing valve v6 where it is mixed with the "heavy" flow F11. The flow F14 is at 25° C. while the flow F11 is at higher temperature (preferably 260° C.); the flow F12 resulting from their mixing has to be cooled down via heat exchanger HE.7 at 50° C. or lower value before to be stored in the oil tank T.1.

The described condensation process within condensers S.5 and S.6 of the fractionation section 210 has two aims: a) separate the non-condensable gases to be addressed to the engine (see below) without oil drops inside; b) separate the heaviest fraction (T>260° C.) in case of start-up period, not steady-state regimes, etc., by avoiding to mix this fraction with the light flow. In these cases, the valve v6 interrupts the connection with flow F11 that is accumulated in the condenser S.5 or deviated (not shown in the figure) in an off-specification tank.

Obviously, a distillation column can be installed in place of this process by reaching an effective fractionation into more flows (NCG, jet fuel, gasoline, kerosene, off-spec.). The choice is driven by economic reasons and distance from the refinery site.

The non-condensable gas flow F15 is sent via non-condensable gas line 35 to a controlled three-way valve v8 that divides the flow F15 into two flows: firstly, the recycled fuel gas return flow F16, which can be zero, is sent to the combustor V.2 via recycled fuel gas return line 38 and recycled fuel gas inlet port 39 (see FIG. 1a) at preferably 25° C. in order to provide additional fuel for the combustion and to guarantee that the set-up operating temperature of the combustor V.2 and therefore the desired temperature of the hot particles flow F7 is reached. Secondly, the larger part of the flow F15 is sent as recycled fuel gas flow F17 via recycled fuel gas line 40 to a combustion engine E.3 where an air flow, preferably a partial stream of the pre-heated air flow FA2, is also fed to produce flue gas and electric energy. The amount of electricity produced is variable but about 0.4 kWh/kg of polyolefins feed F2 are produced by the engine E.3 fed by fuel gas. The flue gas is sent via flue gas line 42 to flue gas treatment equipment and leaves the plant through a stack E.6.

Coming back to the flue gas produced by the combustor V.2, drawn from the cyclone separator S.2 through flue gas line section 32, after the heat exchanger HE.2 it is sent as flue gas flow F23 to another heat exchanger HE.3 via flue gas line section 44 in order to heat the combustion air flow FA1/FA2 at the desired temperature. In the present case, the pre-heating temperature for the flow FA2 has been set at preferably 250° C. After passing heat exchanger HE.3 the flue gas flow F23.3 at preferably 510° C. is led via flue gas line section 46 to a dry cooler HE.4 or a cooling tower, depending on the size of the plant and possible use of the heat. This leads the flue gas temperature at a temperature compatible with the scrubber operation (preferably <130° C., in this example 120° C.). The subsequent scrubbing unit E.4 to which the flue gas flow F23.4 is led via flue gas line section 48 removes from the flue gas particle fines released from the combustor V.2, decreases the temperature and realizes the hydrochloric acid removal due to the off-gas stream. The thus-cleaned flue gas flow F24 leaves the plant through stack E.6.

Figure 1B:
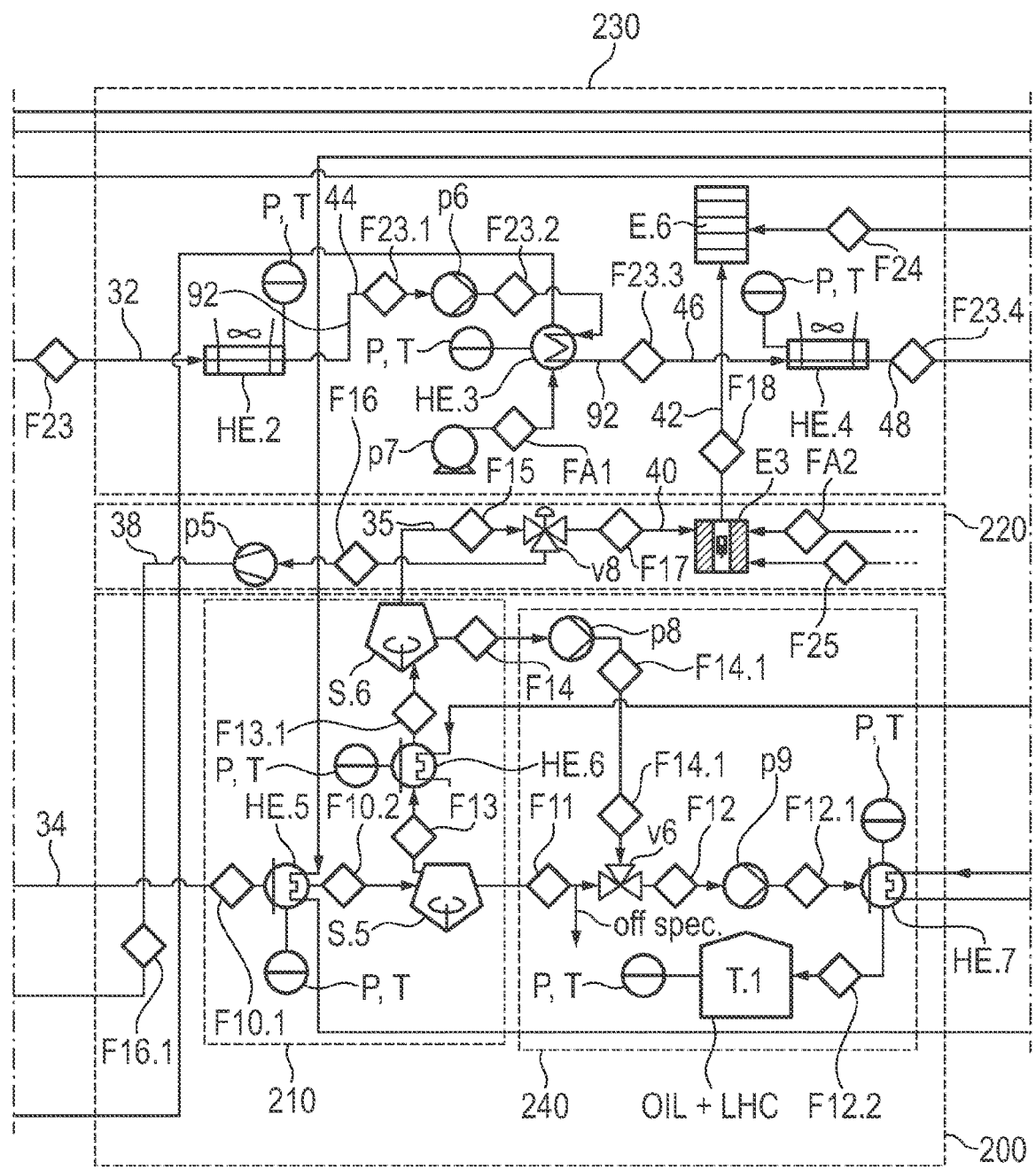

In the exemplary embodiment shown in FIG. 1b a flue gas pump p6 or blower is switched into flue gas line section 44 between heat exchangers HE.2 and HE.3 in order to support the flue gas flow. Alternate or additional flue gas pumps may be switched into other sections, for example 32, 46, 48, of the flue gas line. The entirety of flue gas line sections, in particular 32, 44, 46, 48, constitutes a flues gas line 92.

Figure 1C:
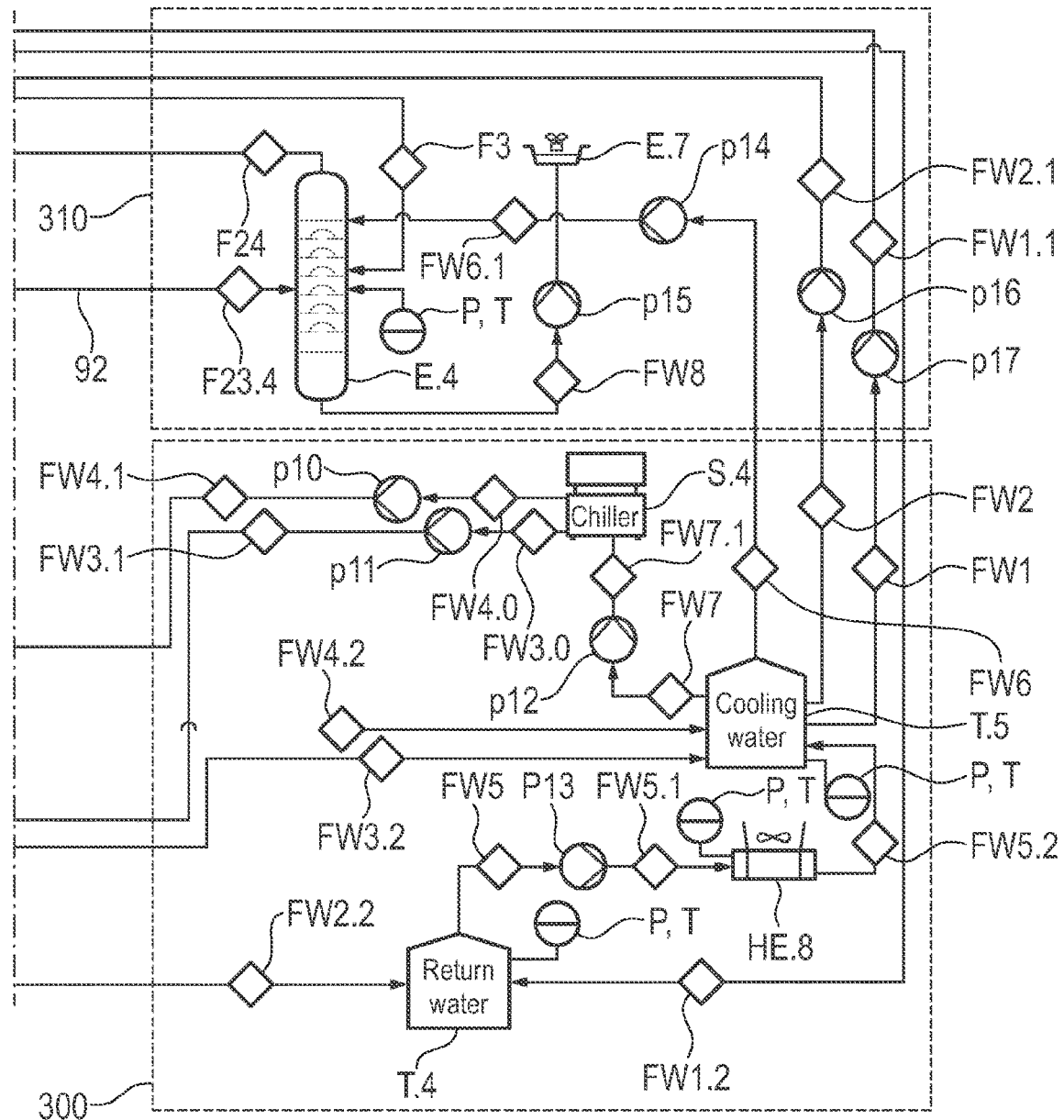

The overall plant is completed by state-of-the-art auxiliaries shown in the section 300 of FIG. 1c such as fresh water supply, cooling water supply, reservoirs for the distillation products, according lines, valves and pumps. However, they are not integral to the working of the invention and thus need not be described here in detail.

Detailed Description of the Cracking Reactor Concept.

The cracking reactor V.1 used in the plant according to FIG. 1a is preferably a two-zone reactor where a continuous stirred tank reactor (CSTR) behavior is ensured in the mid zone while a laminar flow (PFR) behavior is reached in the top zone with essentially two kind of input streams: the main type is dedicated to the plastic input flow F1, preferably in molten state as flow F2, and preferably, but not necessarily, supplemented by the recycled liquid (heavy) pyrolysis products flow F6, pushed by a pump if necessary, while the other is constituted by preferably inert particles (quartz or silica sand, ceramic coated spherule, etc.) preferably having a mean diameter ranged between 50 micron and few millimeters and a high hardness and heat capacity. This (recycled) particles' flow F7 is previously heated in another reactor, namely the combustor V.2 where a desired enthalpy is transferred to a given mass flow of sand particles (see next section for details). The basic topology of input and output flows with respect to the cracking reactor V.1 is also visualized in FIG. 2, describing the spatial structure of an advantageous embodiment and the main flow patterns of particles and pyrolysis products in the reactor V.1 occurring therein during operation.

Figure 2:
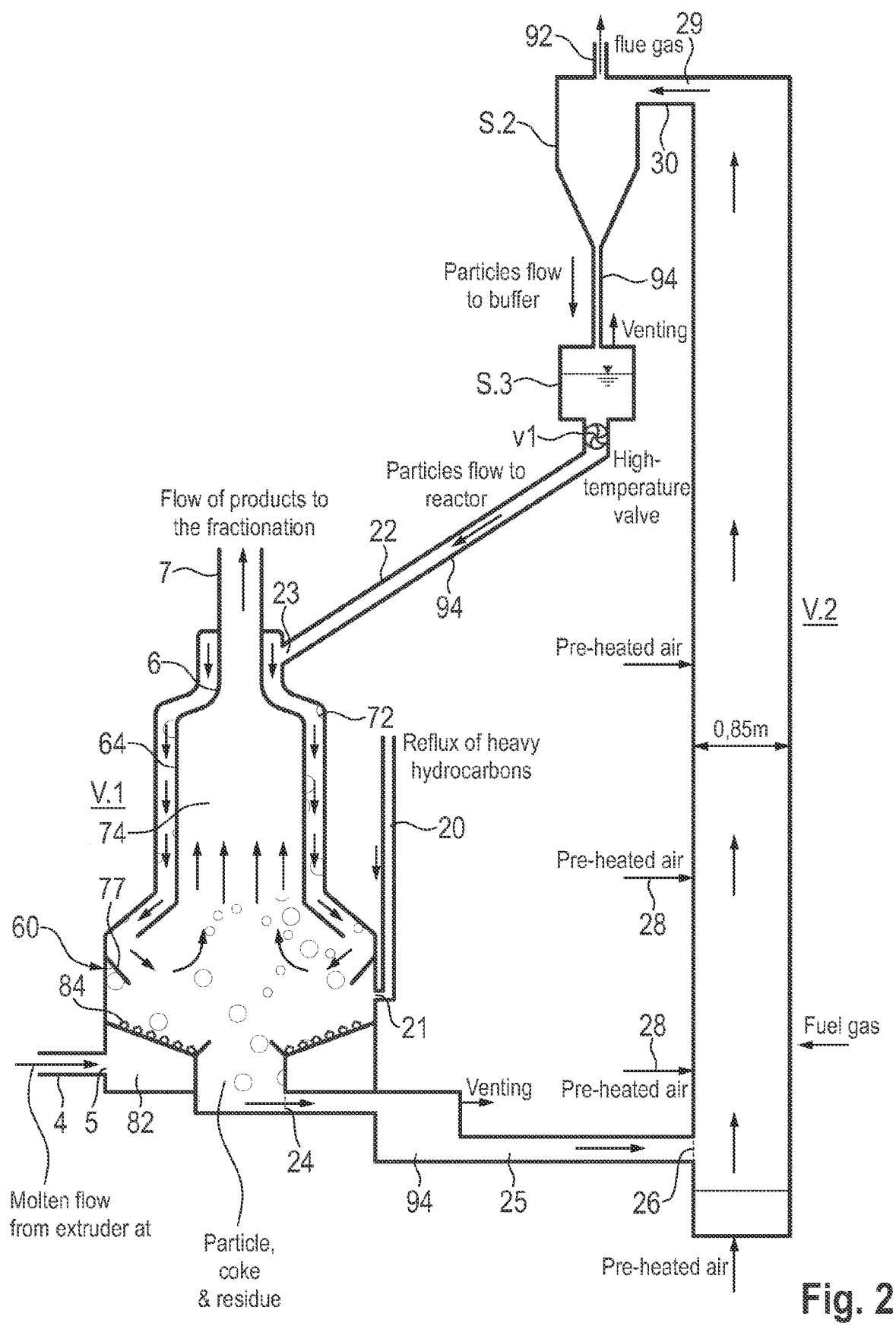
FIG. 2 shows a longitudinal sketch of a cracking reactor and a combustor of the plastic-to-oil plant according to FIG. 1, wherein the flow conditions during operation are indicated by arrows.

FIG. 2 shows also the peculiar connection between the cracking reactor V.1 and the combustor V.2. The combustor V.2 is fed by the main flow F5/F8 made by char and particles and by the flow F16 of recycled fuel gas, if needed, and by the flow FA2 of pre-heated air. This latter has the crucial role to provide the transportation of particles along the combustor V.2 riser so guaranteeing a transport regime. The gas velocity depends by the properties of particles; in the example the flue gas velocity is about 5 m/s. The combustion products and particles outlet port 29 of the combustor V.2 is located higher than the particles inlet 23 port into the cracking reactor V.1, and hence the backflow of particles into the cracking reactor V.1 is supported by gravity.

The sensible heat contained in the particles' flow F7 leads the temperature inside the cracking reactor V.1 to the desired range around preferably 480° C. The heat exchange rate between the intermixing input streams inside the cracking reactor V.1 is really fast due to the multitude of particles (e.g. >400 million for 350-micron sand particles) that merge with the plastic flow and to the peculiar design of the reactor which will now be described in more detail. The mass ratio between the mass flow of particles and the polymer flow is about 3, but it can be changed with different particles or polymer. The FIG. 2 shows the loop 94 of the particles and the route of transportation for the char/coke residue from the bottom of reactor V.1 throughout the port 24, to the transportation screw line 25, to the bottom of combustor V.2. Here, the air flow FA2 introduced throughout the port(s) 28 transports the particles and burns the char/coke along the column. There may be several combustion air inlet ports 28 arranged at different heights of the riser. At the exit, a cyclone separator S.2, or other equivalent device, separates the combustion products and particles output flow F19 into the particles flow F7 and the flue gas flow F22.

Figure 3:
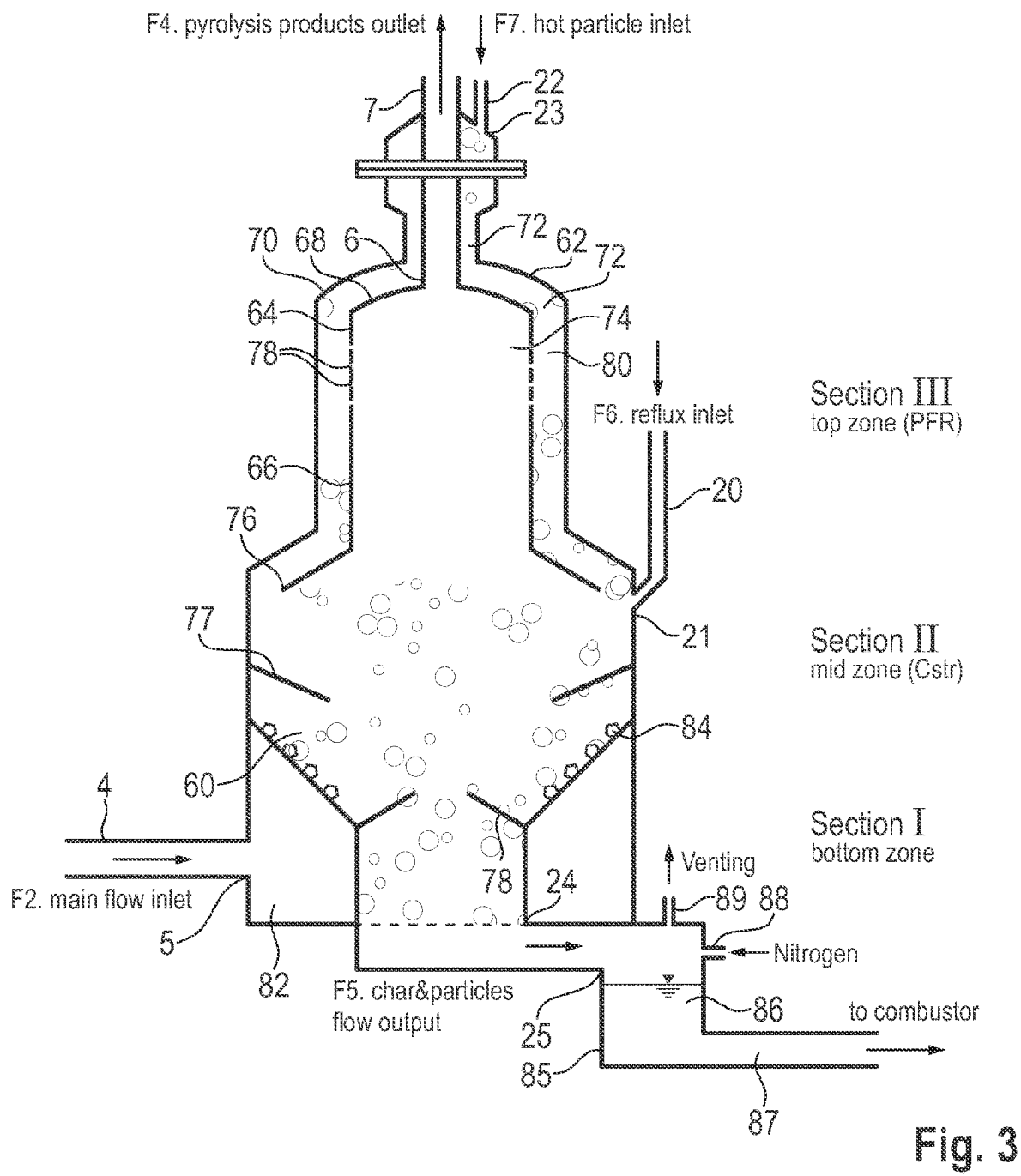
FIG. 3 shows a detailed sketch of the cracking reactor.

Therefore, FIG. 3 shows a longitudinal sketch of an advantageous cracking reactor V.1 of the plastic-to-oil plant according to FIG. 1 and FIG. 2, wherein the density of material inside is indicated by shades. The dark shade is related to a high density of particles with a limited voidage.

The cracking reactor V.1 comprises an upright reactor vessel 60 which in turn comprises, from top to bottom, an essentially spherical or calotte-type cap/cover 62 at the top,
an essentially cylindrical main body (section III),
a tapered or narrowing or double cone-like section (section II), and
an essentially cylindrical outlet section at the bottom (section I)

with a circumferential chamber where the molten polymer is addressed to be injected into the section II from the bottom zone to the mid zone. In section II the diameter of the reactor vessel 60 increases from bottom to top and, after a certain height or volume, decreases to top, that is from the value associated with section II to the (smaller) value associated with section III. Section III and section II together roughly have the shape of an upside-down funnel.

The interior space within section III essentially is divided into two subspaces by an internal partition wall 64: firstly, the inner space 74 surrounded/enclosed by the partition wall 64, and secondly the interspace 72 between the partition wall 64 and the reactor vessel wall 70. The partition wall 64 provides a material barrier but is preferably well heat-conductive. More precisely, the partition wall 64 comprises an essentially cylindrical partition wall section 66 in coaxial arrangement with the cylindrical main body of the reactor vessel 60 and an essentially spherical or calotte-type partition wall cap 68 which follows the contour of the cap 62 of the reactor vessel 60. Therefore, the interspace 72 between the partition wall 64 and the reactor vessel wall 70 comprises a ring-like/annular circumferential part (downcomer channel 80) and a curved top part, in total defining an interconnected (upside down) U-like interspace 72 or channel around the inner space 74 in the sectional view of FIG. 2. At the lower end of the partition wall 64, which is roughly located at the height of the passage/transition from section III into section II, the interspace 72 opens, after an enlargement, into the interior of the reactor vessel 60 via lower openings 76. The distance of the partition wall 64 to the reactor vessel wall 70 is chosen such that the width of the interspace 72 is small in comparison to the total diameter of the reactor vessel 60. In other words, the interspace 72 defines a narrow circumferential channel in comparison to the relatively wide inner space 74.

The circumferential baffles 77 which within section II protrude from the reactor vessel wall 70 into the interior of the reactor vessel 60 can have different angles of inclination and length. They allow to transform the vertical velocity vector of particles flow discharging via openings 76 into a tangential vector, thereby allowing or supporting mixing inside the reactor vessel 60. The baffles 77 allow to affect the residence time of particles and polymers injected from adjacent openings/nozzles, thereby avoiding that both go down in the bottom vessel without a proper reaction time.

The partition wall 64 preferably comprises a number of higher (in comparison to lower openings 76) holes or openings 78, preferably evenly distributed over the vertical (cylinder barrel-like) area, thereby defining small flow passages from the interspace 72 to the inner space 74, bypassing the circumferential downcomer channel 80. Depending on scale the openings 76 can be present or not.

Details of the construction and geometry may vary, but important here is an interspace 72 between an external and an internal wall (double-wall). As described further below, the interspace 72 provides a flow channel for the incoming hot particles flow F7 which is in heat exchange relation to product flow within the inner space 74 of the reactor vessel 60 and which has as well-defined outlet geometry in order to promote mixing of the different flows.

The plastics/polymer flow is sent by a tube of the feed line 4 under a pressure preferably larger than 50 bar into a preferably circumferential volume or chamber 82, which is located at section I around the cylindrical char and particles outlet and which is connected via a number of distributing openings or through holes (distributors), in particular nozzles 84, in the vessel wall of the cone-like transition zone to section II. The distributors or nozzles 84 are preferably evenly or uniformly distributed over the circumference of the annular cone area, and they are preferably located below the baffles 77. The pressure difference between chamber 82 and vessel 60 creates high velocity streams of plastics/polymer flow inside the section II of the reactor. The preferably annular chamber 82 or plenum functions as a distribution ring, distributing the incoming plastic melt flow to the distributors or nozzles 84.

Figure 4:
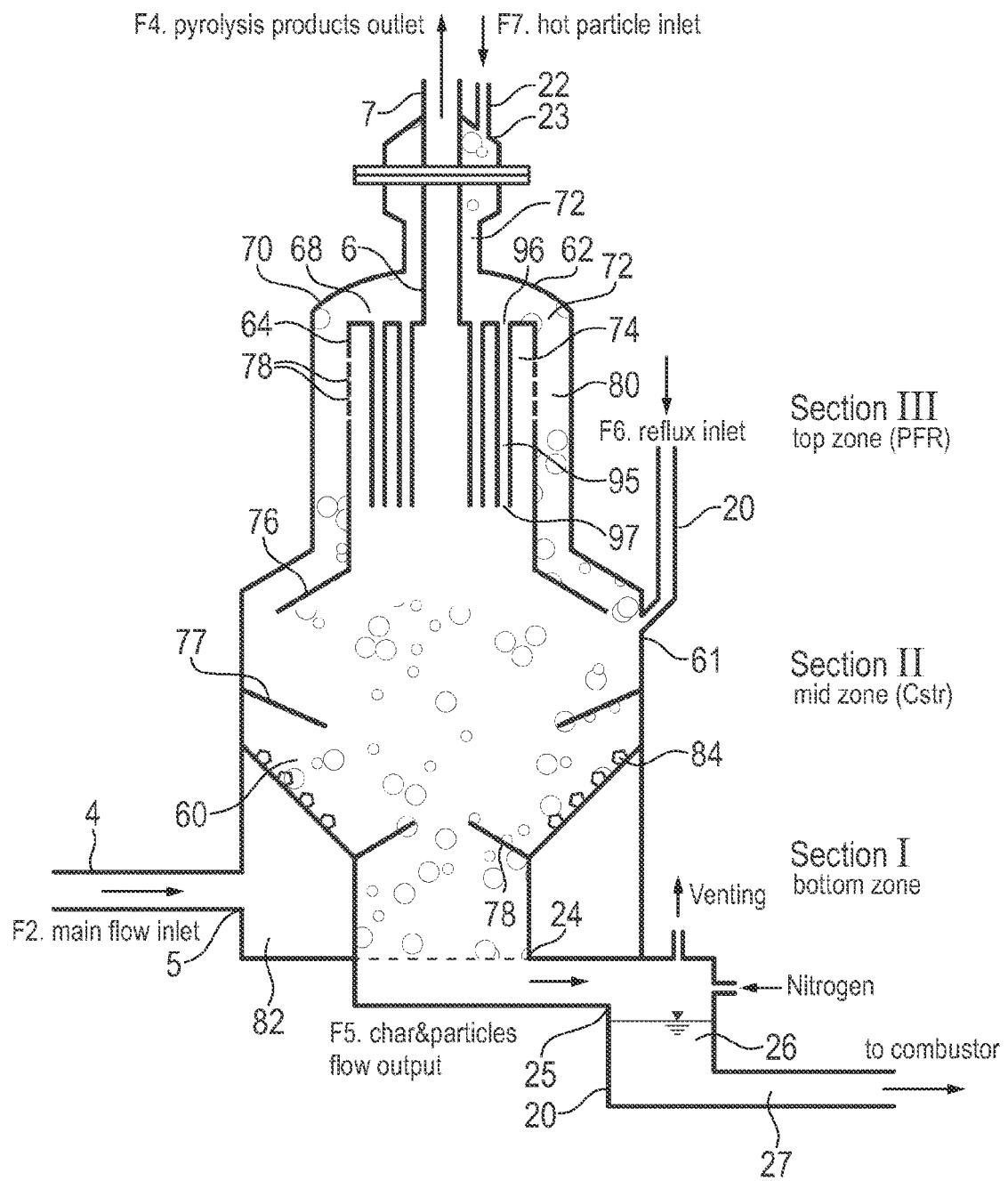
FIG. 4 shows a variation of FIG. 3.

The pressure of preferably more than 50 bar in the annular chamber 82 or plenum is reached thanks to the driving force realized by the feeding and pre-conditioning equipment E.1, which preferably comprises an extruder, and is correlated to the shape and size of the nozzles 84 (see FIG. 3 and FIG. 4). The value depends on the nozzles' 84 pressure drop. A given number of nozzles 84 having a given size and shape allows to create a pressure drop over 50 bar, so promoting a pressurized flow into the reactor vessel 60, such that the injected molten polymer is in a liquid-like state (above a corresponding density threshold value).

Therefore, feed line 4 which carries the input plastic melt flow F2 flow after pre-conditioning of the input flow F1 of plastic waste in the feeding and pre-conditioning equipment E.1 discharges into the reactor vessel 60 via plastic melt flow inlet port 5 and nozzles 84 roughly at section II. Pyrolysis products recirculation line 20 which carries the recycled liquid (heavy) pyrolysis products flow F6 preferably discharges into the reactor vessel 60 throughout the recirculation line 20 and inlet port 21 which is preferably located above the baffles 77 in section II. Alternatively, there may be a separate discharge opening into the reactor vessel 60, preferably at the height of section I. The recirculation line 20 can be also absent if heavy fraction is produced in small amount or not produced at all.

Recycled particles feed line 22 which carries the recycled particles flow F7 of cleaned and heated particles coming from the combustor V.2 discharges into the top region of the vessel, preferably at the center of the top cover 62. The flow of hot particles is therefore injected into the interspace 72 and possibly split into two parts: firstly, a downflow in the annular downcomer channel 80 which enters the interior of the reactor vessel 60 at the lower end of the partition wall 64 through lower openings 76, and secondly a spray-like flow through the lateral openings 78 in the top zone of the partition wall 64, thereby bypassing the circumferential downcomer channel 80.

Pyrolysis products output line 7 which carries the output flow F4 of pyrolysis products from the cracking reactor V.1 is preferably connected to the upper part of section III of the reactor vessel 60 through pyrolysis products outlet port 6. The line connection reaches through the interspace 72. In other words, the pyrolysis products outlet port 6 or opening into the output line 7 is located within the partition wall cap 62 such that the output flow F4 through said line does not interfere with the hot particles input flow in the circumferential downcomer channel 80. Furthermore, the arrangement is preferably such that the pyrolysis outflow does not interfere with the particles inflow through openings 78.

Furthermore, the output flow F5 of chars and particles gathering in the reactor vessel 60 as a consequence of the pyrolysis process within the vessel is extracted at the bottom of section I and led via char and particles outlet port 24 into char and particles output line 25.

The flow F5 is addressed to a buffer vessel 85, kept under depression and possibly under nitrogen flow via nitrogen inlet 88, to form a static head 86. The feeder 87, which is part of the transport and metering system E.2 indicated in FIG. 1, extracts the char & particles flow, addressing it to the combustor V.2. The static pressure and inertization by using nitrogen allow to avoid (back-) flow of oxidant gas from combustor V.2 to pyrolizer/cracking reactor V.1. A safety valve v3 to provide an immediate pipe closing is also located here (FIG. 1*a*). A venting line 89 attached to buffer vessel allows for addressing the pyrolysis gas into the combustor by means a dedicated pump in order to avoid overpressure in the feeder and undesired combustion in a limited volume of the feeder at the combustor inlet, where oxygen diffusion is possible.

As will be even more apparent from the subsequent description of the hydrodynamics within the reactor vessel 60 (see next section), the reactor design specified above is optimized to promote uniform heating by avoiding hot areas/spots and to promote a perfect mixing. The interspace 72 is where the hot inter particles flow promotes an indirect heating in the top zone of the inner space 74. When the hot particles in the downcomer channel 80 reach the mid zone of the reactor vessel 60 via lower openings 76, they enter in the interior of the reactor by mixing with the feed rate of polymers, and then the reaction occurs with high efficiency. The purpose a of possible flow of particles through holes 78 to the interior of the top zone of the reactor vessel 60 is to balance the heat loss in the top zone due to completion of reactions (endothermic reactions). The lowering of temperature is avoided in order to keep the kinetic rate at high level. Nevertheless, the openings 78 are not necessary in all cases and can be totally avoided.

The cracking reactor V.1 is designed to have an internal diameter able to promote a superficial gas velocity of pyrolysis products much larger (about 3 times) than the "minimum fluidization velocity" of sand. This means that:

$$U_g = \frac{W_{reacting\_matter} / \rho_{reacting\_matter}}{S_{mid\ zone}} \gg U_{mf}\ [m/s]$$

Where: $U_g$ is the superficial gas velocity; $U_{mf}$ is the minimum fluidization velocity function of particles properties and reactor temperature; $W_{reacting\_matter}$ is the pyrolysis products mass rate; $S_{mid\ zone}$ is the transversal section of reactor as calculated by taking into account the voidage of the bed, function of the internal diameter of reactor, related to section II.

The mixing in the reactor is then promoted by the flow of hot particles fed at different levels of the reactor vessel 60 as explained above.

As described above with reference to FIGS. 1 and 2, at the bottom (section I) of the reactor vessel 60, the particles accumulate together with heavier products produced by the chemical reactions including the carbonaceous by-products (char). From this zone a transport and metering system (feeder) E.2 transports the particles and the carbon stuck on them to an entrained combustor V.2 where the carbon, plastic residues and tars are burned, therefore the particles are cleaned and also heated at the combustor temperature, that is preferably between 750 and 1000° C. The subsequent cyclone separator S.2 is preferably mounted at the top of combustor V.2 and is preferably equipped with a rotary valve v1 on the downstream side which distributes in a controlled manner the regenerated and heated particles in the cracking reactor V.1.

This loop can be infinitely reproduced, thereby avoiding expensive methods to produce and provide heating as well to use mechanical parts inside the reactors for mixing, to sustain cost for disposal of carbon and residues.

Moreover, it allows to control the temperature level in the cracking reactor V.1 simply by increasing the energy content of the hot particles. As previously described, an additional input of (recycled) fuel gas can be fed inside the combustor V.2 via recycled fuel gas return line 38 in order to manipulate the energy balance in the case the flow extracted by the cracking reactor V.1 does not contain enough combustion heat for the combustor V.2 (preferably, both particle mass flow and temperature in the combustor V.2 can be regulated).

A variation of the embodiment according to FIG. 3 is shown in FIG. 4. In this case a number of vertical standpipes 95 is arranged within Section III of the reactor vessel 60. On the upper end the respective standpipe 95 is fluidically connected to the upper region of the interspace 72. That is, the standpipe 95 comprises an inlet opening 96 which is arranged in the partition wall cap 68. On the lower end, the respective standpipe 95 comprises an outlet opening 97, blowing into the interior of the reactor vessel 60. Preferably, the respective outlet opening 97 is arranged in a lower region of Section III, just above the transition into Section II. Therefore, a fraction of the particles stream entering via particles inlet port 23 into the interspace 72 is led directly into the standpipes 95, leaving them at the lower outlet openings 97, and hence bypassing downcomer channel 80. This is preferred, especially for larger reactors, to promote a uniform distribution of particles from the top to the bottom. Otherwise, the reactor design is like in FIG. 3.

Hydrodynamics.

The cracking reactor V.1 described above with reference to FIG. 3 and FIG. 4 can be virtually divided into three zones:

The bottom zone (section I) where a high density of particles and solids is present and a fixed bed is formed.

The mid zone (section II) where the incoming plastic flow enters the reactor vessel throughout nozzles 84 and is mixed with particles, thereby occurring the cracking. Here the particles are suspended in the liquid-vapor mixture creating a sort of self-generated fluidization behavior helped by the particles momentum whose direction is modified by the baffles 77.

Finally, the top zone (section III) is more diluted and largely occupied by vapors. In this zone the hydrodynamic regime is close to be laminar and the heat transfer coefficient is much lower with respect to the mid zone.

To increase the heat transfer rate between the interspace 72 and the interior of section III a reduced diameter of this latter section is used. In case of very large reactor a part of flow F7 of hot particles should be addressed here via openings 78 in order to balance the temperature drop, or a series of vertical standpipes should be added to create a larger exchange surface. By the chemical point of view, the mid zone is where cracking occurs while the top zone is where the secondary and tertiary reactions, including cyclization and isomerization, are completed together with waxes cracking. The densities of mixture in the mid zone and in the top have different values by changing from 500 kg/m$^3$ to 2 kg/m$^3$.

The value of superficial gas velocity reached in the mid zone of reactor makes the Reynolds number very high and, as a consequence, the hydrodynamic regime is turbulent. This high value of Reynolds number allows to reach a very large convective coefficient of heat transfer. The calculation for this convection coefficient (h) needs to refer to the theory of heat exchange in fluidized beds, by considering the mid zone of the reactor a sort of fluidized bed without any addition of external fluidizing gas. The application of equations and the set of physical chemical properties of the mixture at the reactor temperature, led to evaluate the Nusselt number and, from this latter, the heat of convection (h). The value of "h" depends on the virtual thickness of the polymer around each particle. The h value ranges between 2000 W/m$^{2\circ}$ C. (best case) and 449 W/m$^{2\circ}$ C. (worst case).

Whatever is the value of h, the heating time necessary to reach the reaction temperature is less than few seconds.

The reaction process is then controlled by the kinetic rate of chemical conversion. The reactor volume is then obtained by using the kinetic equation. The first order kinetics allows to obtain the residence time ($t_R$) by fixing the conversion degree ($x_R$), the reactor temperature ($T_R$) and the kinetic parameters (E, $k_0$). Starting from: $x_R = 1 - \exp(-k \cdot t_R)$ where $k = k_0 \cdot \exp(-E/RT) = 2,4 \cdot 10^{+9} \cdot \exp[-156000/8.31/(273+T_R)]$ $= 3,7 \cdot 10^{-2}$ s$^{-1}$ (at 480° C.), the residence time is: $t_R = 160$ s.

The required volume of reactor necessary to convert polyolefins into oil with the invention is few liters for each polymer feed rate (e.g. from 3 to 6 liters/(kg/h) for given feeding and reactor temperature), much smaller than other technologies where the massive recycling of pyrolysis products to the reactor, used to promote mixing and heat exchange, requires a very large volume.

Mass and Enemy Balance.

Figure 5:
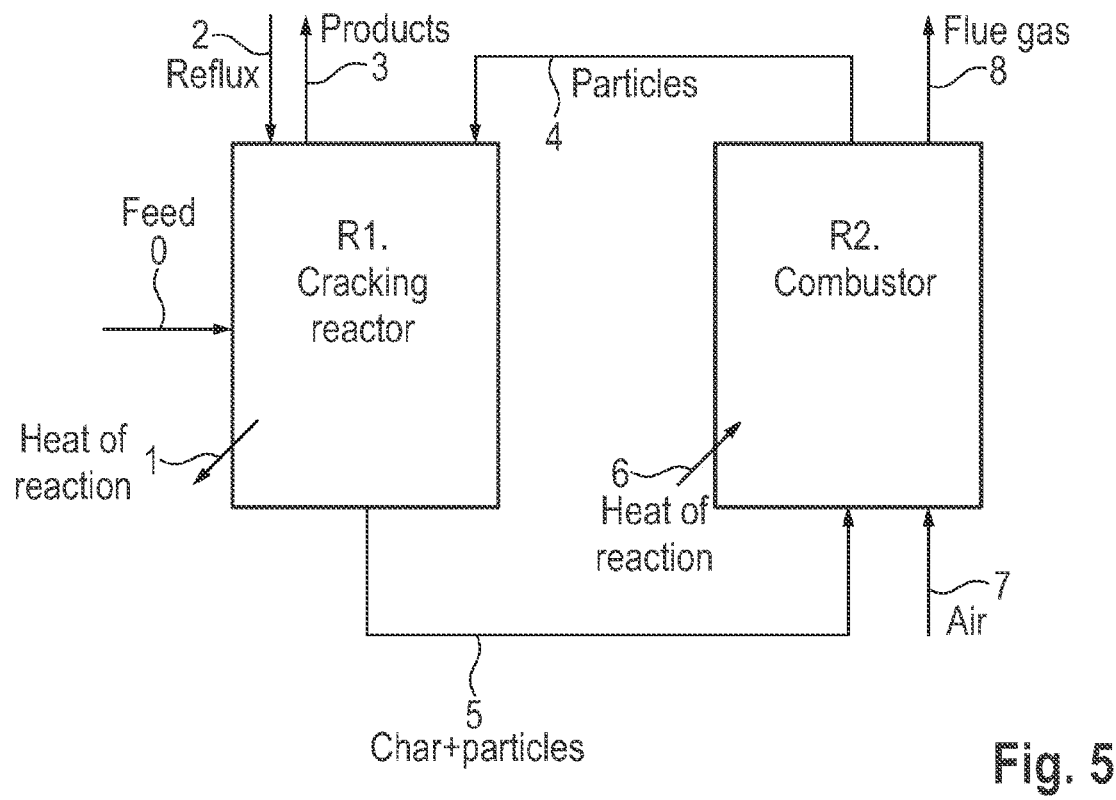
FIG. 5 shows an exemplary diagram for the mass and energy balance of core processes in a plant according to FIG. 1.

The mass and energy balance of the core processes in a plant according to the invention for a typical case with given values of mass feed rates of polymers and particles is reported in FIG. 5 and associated Table 1 (legend).

With reference to energy flows, the according arrow inside the reactors represents: the endothermic reactions heat (arrow from internal to external), that is the heat to be provided to the system by external sources; and the exothermic reactions heat (arrow from external to internal), that is the heat generated by the system.

The energy balance is provided in order to show that the chemical energy of carbon discharged from the bottom of the cracking reactor V.1, once it is converted into sensible energy in the combustor V.2, is sufficient to guarantee that the reactor reaches the desired reaction temperature. In case the char/coke fraction is lower than expected by kinetic model, a part of fuel gas, accordingly with the FIG. 1b is addressed to the combustor to provide the necessary chemical energy.

Summary.

Preferred main characteristics of the the plant according to the invention can be summarized in tabular form as follows:

| | |
|---|---|
| Physical state of plastic feeding | Low viscous liquid |
| Reactor type | Continuous |
| Hydrodynamics regime | Turbulent (for more than 80% of reaction time) |
| Heating method | Direct internal (exchange with hot particles) |
| Heating rate | Very fast |
| Waste (as fraction feeding) | 0% |

Among others, the following advantages are obtained by the above described system of twin reactors (cracking reactor V.1 and separate combustor V.2):

a) No carbonaceous solid to dispose as waste.

b) Intrinsic cleaning of particles that can be reintroduced in the cracking reactor without any need of discharge or make-up.

c) Heating up of particle flow to be recirculated in the cracking reactor to a temperature in a wide range of temperatures (preferably between 750 and 950° C.).

d) Easy regulation of particle flow temperature by changing the combustion conditions (excess of air, air preheating, additional fuel).

e) Change of particles hold up in the system so affecting the temperature of recirculated particles by manipulating the flow F5.

f) Change of particles particle size and density induces the change of hydrodynamics in the reactor bottom and top zones.

LIST OF REFERENCE SYMBOLS 1 heat exchanger
2 pre-conditioning off-gas line
4 plastic melt flow feed line
5 plastic melt flow inlet port
6 pyrolysis products outlet port
7 pyrolysis products output line
10 cooling medium supply line
12 cooling medium discharge line
14 connecting line
16 gas-liquid separator
18 pyrolysis gas exhaust line
20 pyrolysis products recirculation line
21 recycled pyrolysis products inlet port
22 (recycled) particles feed line
23 (recycled) particles inlet port
24 char and particles outlet port
25 char and particles output line
26 char and particles inlet port
27 combustion air supply line
28 combustion air inlet port
29 combustion products and particles outlet port
30 combustion products and particles output line
31 line junction
32 flue gas line section
34 fractionation gas input line
35 non-condensable gas line
38 recycled fuel gas return line
39 recycled fuel gas inlet port
40 recycled fuel gas line
42 flue gas line
44 flue gas line section
46 flue gas line section
48 flue gas line section
60 reactor vessel
62 cap/cover
64 partition wall
66 cylindrical partition wall section
68 partition wall cap
70 reactor vessel wall
72 interspace
74 inner space
76 lower opening
77 baffle
78 higher opening
80 downcomer channel
82 chamber (plenum)
84 nozzle
85 buffer vessel
86 static head
87 feeder
88 nitrogen inlet
89 venting line
90 fluid/particles separator
92 flue gas line
94 particles loop
95 standpipe
96 inlet opening
97 outlet opening
E.1 feeding and pre-conditioning equipment
E.2 transport and metering system
E.3 combustion engine
E.4 scrubbing unit
E.5 suction buffer
E.6 flue gas cleaning unit and stack
F1 input flow of plastic waste
F2 input plastic melt flow
F3 pre-conditioning off-gas flow
F4 pyrolysis products output flow
F5 char and particles flow
F6 (recycled) liquid pyrolysis products flow
F7 (recycled) particles flow
F10 gaseous pyrolysis products flow
F11 condensed pyrolysis products flow
F12 flow resulting from mixing flows F11 and F14
F14 liquid phase flow
F15 non-condensable gas flow
F16 recycled fuel gas return flow
F17 recycled fuel gas flow
F19 combustion products (and particles) output flow
F21 purge/fuel gas flow
F22 flue gas flow
F23 flue gas flow
F24 flue gas flow
FA1 (cold) combustion air flow
FA2 (heated) combustion air flow
HE.1 heat exchanger
HE.2 heat exchanger/cooler
HE.3 heat exchanger
HE.4 heat exchanger/cooler
HE.5 heat exchanger
HE.6 heat exchanger
HE.7 heat exchanger
p2 suction pump
p3 suction pump
p4 pump
p6 flue gas pump
p7 air blower
p8 pump
S.2 cyclone separator
S.3 particles buffer
S.5 condenser
S.6 condenser
T.1 oil tank
v1 rotary valve
v3 safety valve
v6 mixing valve
v8 three-way valve
V.1 cracking reactor
V.2 combustor

The invention claimed is:

1. A plant for converting plastics into petrochemical products, comprising:
a cracking reactor for a pyrolysis reaction or thermo-chemical process, wherein the plastics is converted into at least gasified pyrolysis products and char, and further comprising a combustor;
the cracking reactor comprising a reactor vessel with a bottom section, a middle section and a top section, the reactor vessel further comprising a plastics inlet port, a particles inlet port, a pyrolysis products outlet port discharging from the top section, and a char and particles outlet port discharging from the bottom section;
the combustor comprising a char and particles inlet port, a combustion air inlet port, and a combustion products and particles outlet port,
the char and particles outlet port of the cracking reactor being connected to the char and particles inlet port of the combustor, and the combustion products and particles outlet port of the combustor being connected to the particles inlet port of the cracking reactor, the cracking reactor and the combustor are connected in a particles loop which contains a multitude of solid particles, such that during operation the particles are cycled from the cracking reactor to the combustor and back to the cracking reactor, wherein mixing in the cracking reactor is promoted by a flow of particles fed at the top of the cracking reactor counter to a flow of the pyrolysis products and without the need of mechanical mixing devices, wherein the plastics inlet port is a plastic melt flow inlet port, wherein the plastic melt flow inlet port feeds a plastic melt flow into an annular chamber which opens into the middle section of the reactor vessel via a plurality of high-pressure nozzles, said nozzles being capable of injecting high viscous plastic melt at a pressure of at least 50 bar into the vessel body, wherein the particles inlet port leads into a channel which opens at least in part into the middle section, and wherein said channel comprises a space between an external reactor vessel wall and a heat conductive internal partition wall.

2. The plant of claim 1, wherein a fluid/particles separator comprises a cyclone separator is arranged in connection between the combustion products and particles outlet port of the combustor and the particles inlet port of the cracking reactor, such that particles enter the particles inlet port and no fluidic combustion products enter the particles inlet port.

3. The plant of claim 2, wherein a flue gas line leads fluidic combustion products from the fluid/particle separator to a flue gas treatment facility which comprises a scrubbing unit.

4. The plant of claim 2, wherein the pyrolysis products outlet port of the cracking reactor is connected via a pyrolysis gas exhaust line to a fractionation section and/or distillation column.

5. The plant of claim 4, wherein a heat transfer system is configured to transfer heat from a flue gas flow within the flue gas line to a gaseous pyrolysis products flow within the pyrolysis gas exhaust line leading to the fractionation section and/or distillation column.

6. The plant of claim 1, wherein a pyrolysis products recirculation line is connected to the cracking reactor such that during operation condensed pyrolysis products are at least partially recirculated into the cracking reactor.

7. The plant of claim 3, wherein a heat exchanger is arranged in the flue gas line such that the heat exchanger transfers heat of a flue gas flow within the flue gas line to a combustion air flow within a combustion air supply line leading to the combustion air inlet port of the combustor.

8. The plant of claim 4, wherein a recycled fuel gas return line leads from the fractionation section or distillation column to the combustor.

9. The plant of claim 4, wherein a recycled fuel gas line leads from the fractionation section or distillation column to a combustion engine which is coupled to an electrical generator.

* * * * *